3,296,035
THERMOCOUPLE HAVING TUNGSTEN-RHENIUM ALLOY LEG WIRES
Edward D. Zysk, Livingston, N.J., assignor to Engelhard Industries, Inc., Newark, N.J., a corporation of Delaware
Filed Apr. 1, 1963, Ser. No. 269,390
6 Claims. (Cl. 136—227)

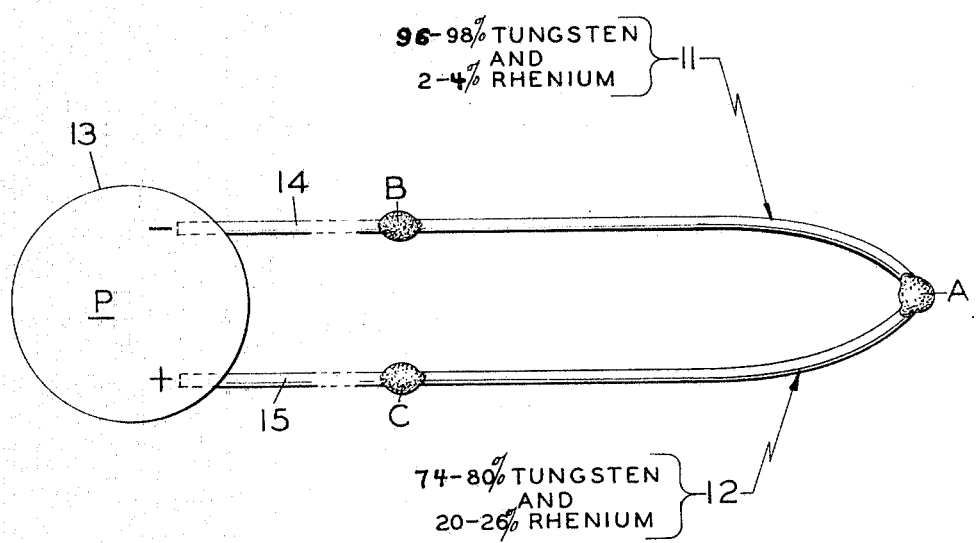

The present invention relates to thermocouples and particularly to leg and lead wire combinations for high temperature thermocouples.

Thermocouples are formed by connecting two wires of dissimilar metals having a difference in electric potential which varies as the temperature at the junction of the wires, referred to as the "hot junction," varies. The difference in potential is measured with a potentiometer, or other instrument for measuring E.M.F. (electromotive force), connected across the wires at their free ends.

The thermocouple must, of course, be made of metals which withstand temperatures in the range in which the thermocouple is intended to be used. Beyond that, metals are selected which will produce the largest and most uniform variation in E.M.F. output per degree of temperature change within the range in which it is desired to have the thermocouple most accurate.

In many cases the metals which are best adapted for accurate high temperature thermocouples are the more expensive metals. Consequently, it is desirable to be able to have the expensive thermocouple leg wires as short as possible and use less expensive metal lead wires to connect the legs to the instrument for measuring potential difference. But finding lead wires to match the leg wires is a problem.

For a match the lead wires must not distort the E.M.F. output of the leg wires sufficiently to interfere with the accuracy of the thermocouple. Since the lead wires are of different metals from the leg wires they form couples at the connections which produce E.M.F. responses dependent upon the temperature at the connections. These connections are referred to as the leg wire-lead wire junctions and the temperature at these junctions is determined by the heat conducted along the leg wires from the hot junction and by the surrounding temperature. The temperature at the leg wire-lead wire junctions is therefore lower than but relative to the temperature at the hot junction and the amount of difference depends upon the length of the legs and the extent to which the leg wire-lead wire junctions are insulated from the surroundings.

For a suitable match the E.M.F. output of a couple formed by the leg wires should be substantially the same as the E.M.F. output of a couple formed by the lead wires at the temperatures expected at the leg wire-lead wire junctions when the temperature at the hot junction is in the range in which the thermocouple is intended to be used. In a sense the consideration of the lead wires as a couple and the leg wires as a couple at temperatures expected at the leg wire-lead wire junctions is hypothetical, since the couples which exist in the operating thermocouple are formed by the junctions of the respective leg and leadwires. However, in testing for a suitable match these hypothetical couples are actually formed and tested within the contemplated temperature range for if these hypothetical couples have similar response then the respective leg and lead combinations will have similar responses and thus be suitably matched.

The present invention is a high temperature thermocouple having leg wires of tungsten-rhenium alloys and matching lead wires. Rhenium is an expensive metal and the present invention has the advantage of providing a thermocouple which has high E.M.F. response to temperature changes within a range of high temperature due to the rhenium alloyed with tungsten and yet the cost is kept down without sacrificing accuracy by providing matching lead wires of less expensive metals.

In addition the lead wires are easier to bend and shape around corners and obstructions than the tungsten-rhenium alloy leg wires and thus facilitate the connection to a measuring instrument The objects, advantages and details of the thermocouple of the present invention will be more apparent from the following description and accompanying schematic diagram of a thermocouple in accordance with this invention.

As seen in the diagram a thermocouple in accordance with the present invention has a hot junction, marked A, at which a thermoelectric leg wire 11 is joined to another thermoelectric leg wire 12 of a different metal by welding or other appropriate means to make a good connection. The thermoelectric response of the leg wires 11 and 12 to heat at the hot junction A is measured by a potentiometer 13 or other instrument for measuring the difference in electric potential. As mentioned above the leg wires 11 and 12 are made as short as possible and are connected to the potentiometer 13 by lead wires 14 and 15 of less expensive metal.

As shown, the lead wires 14 and 15 are connected to the leg wires 11 and 12 respectively at B and C which are the leg wire-lead wire junctions. Since the leg and lead wires are of different metals, they form couples which have E.M.F. outputs determined by the temperature at the junctions B and C. In order for the lead wires to match the leg wires the E.M.F. output of the lead and leg wire couples at the junctions B and C should be closely equal over the temperature range expected at these junctions.

In accordance with the present invention the positive thermoelectric leg wire is an alloy of 96–98% tungsten and 2–4% rhenium. The other or negative leg wire is an alloy of 74–80% tungsten and 20–26% rhenium. All percentages of ingredients of the alloys described herein are to be understood as being percentages by weight.

Preferred alloys used for the leg wires are 97% tungsten and 3% rhenium for the positive leg and 75% tungsten and 25% rhenium for the negative leg but the lead wires described in detail below are adapted for use with leg wires whose proportions of tungsten and rhenium may be varied within the ranges set out in the previous paragraph.

In addition, in practice, minute traces of materials such as thorium oxide, potassium, aluminum or silicon are sometimes added to the alloys of the leg wires to retard grain growth and thereby increase the useful life of the wires at the high temperatures to which they are subjected. The inclusion of these materials does not alter the thermoelectric properties of the above described leg wire alloys sufficiently to reduce the precision at which the tungsten-rhenium couples are used and it is to be understood that the above alloys with grain growth retarding materials added are intended to be included in the scope of the invention.

Previous thermocouples having a 100% tungsten leg versus a leg of 74% or 75% tungsten and 25% or 26% rhenium tend to fail rapidly in service due to recrystallization and grain growth of the tungsten leg. A couple having a 95% tungsten—5% rhenium leg versus a 75% tungsten—25% rhenium leg was tested and found to provide successful high temperature operation for substantially longer periods than a tungsten versus 75% tungsten—25% rhenium couple. However, the 100% tungsten versus 75% tungsten—25% rhenium couple produces higher E.M.F. responses at temperatures around 2000° C. and above.

The thermocouple in accordance with the present invention having a leg of 96-98% tungsten—2-4% rhenium—and preferably 97% tungsten—3% rhenium—versus a 75% tungsten—25% rhenium leg has advantages over couples with either a 100% tungsten leg or a 95% tungsten—5% rhenium leg versus a leg of 75% tungsten—25% rhenium. The 95% tungsten—3% rhenium leg, particularly when doped with trace amounts of grain growth inhibitors as described above, has a much longer useful life than the 100% tungsten leg, and frequently in tests exhibited greater high temperature physical stability than the 95% tungsten—5% rhenium leg.

The E.M.F. response of a couple of this invention having a 97% tungsten—3% rhenium leg versus a 75% tungsten—25% rhenium leg is higher than that of a couple with a 100% tungsten leg versus a 75% tungsten—25% rhenium leg at temperatures below about 2150° C. and nearly as high at higher temperatures. Its E.M.F. is notably higher than the couple with the 95% tungsten—5% rhenium leg at all working temperatures above 1400° C. Comparative E.M.F. measurements are shown in the following Table I.

TABLE I.—E.M.F. IN MILLIVOLTS

| Hot junction Temperature, °C.* | W vs. 74% W—26% Re | 97% W—3% Re vs. 75% W—25% Re | 95% W—5% vs. 75% W—25% Re | 95% W—5% Re vs. 74% W—26% Re |
|---|---|---|---|---|
| 0 | 0 | 0 | 0 | 0 |
| 100 | 0.356 | 1.071 | 1.38 | 1.414 |
| 200 | 1.033 | 2.450 | 3.01 | 2.982 |
| 300 | 2.030 | 4.060 | 4.81 | 4.735 |
| 400 | 3.330 | 5.830 | 6.69 | 6.613 |
| 500 | 4.848 | 7.710 | 8.61 | 8.546 |
| 600 | 6.548 | 9.651 | 10.56 | 10.495 |
| 700 | 8.395 | 11.639 | 12.50 | 12.422 |
| 800 | 10.386 | 13.641 | 14.39 | 14.327 |
| 900 | 12.431 | 15.637 | 16.30 | 16.213 |
| 1,000 | 14.527 | 17.613 | 18.15 | 18.077 |
| 1,100 | 16.695 | 19.580 | 19.96 | 19.902 |
| 1,200 | 18.847 | 21.540 | 21.72 | 21.652 |
| 1,300 | 20.954 | 23.461 | 23.46 | 23.321 |
| 1,400 | 23.005 | 25.292 | 24.05 | 24.936 |
| 1,500 | 24.918 | 27.034 | 26.60 | 26.484 |
| 1,600 | 26.758 | 28.689 | 28.07 | 27.890 |
| 1,700 | 28.569 | 30.250 | 29.47 | 29.213 |
| 1,800 | 30.352 | 31.720 | 30.78 | 30.489 |
| 1,900 | 31.112 | 33.142 | 32.05 | 31.747 |
| 2,000 | 33.835 | 34.500 | 33.23 | 32.978 |
| 2,100 | 35.524 | 35.781 | 34.38 | 34.174 |
| 2,200 | 37.145 | 36.960 | 35.44 | 35.289 |
| 2,300 | 38.325 | 37.996 | 36.39 | 36.529 |
| 2,400 | | 38.840 | 37.18 | |

*Reference junction at measuring instrument maintained at °C.

The couple having a leg wire of 97% tungsten—3% rhenium versus a leg wire of 75% tungsten—25% rhenium produces high and uniform variations in E.M.F. per degree of temperature change within a range from 0° to about 2700° C. at the hot junction A. This couple is considered best of the couples of the above Table I for use at the higher temperatures in this range. At the higher temperatures the couples should be protected from oxidation. Suitable protection against oxidation is provided by surrounding the couple with an atmosphere of hydrogen, helium, argon, and nitrogen-hydrogen mixtures. A good vacuum is also suitable.

In accordance with the present invention the negative lead wire for the negative leg wire of 74-80% tungsten—20-26% rhenium is an alloy lead wire composed of 96-99% copper, 0.5-3% nickel and 0-1.5% manganese. One suitable negative lead wire used in practice is an alloy wire having 98.8% copper, 0.8% nickel and 0.4% manganese. The lead wire for the 96-98% tungsten—2-4% rhenium leg is an alloy wire of 75-85% nickel, 15-25% chromium, 0-2% manganese and 0-0.15% carbon and a particular alloy wire used in practice contains about 80% nickel and 20% chromium.

In the usual arrangement the leg wire-lead wire junctions B and C are close together and are the same distance from the hot junction A. The temperature at both junctions B and C will therefore be substantially the same. As previously discussed the difference between the temperatures at the hot junction A and the leg wire-lead wire junctions B and C is determined by the distance of the junctions B and C from the hot junction A and the extent to which the junctions B and C are insulated from the surroundings. The range of temperatures at the junctions B and C when the hot junction A is within the range of temperatures which the thermocouple is adapted to measure can therefore be adjusted and fixed by varying the length of the legs and varying the insulation of the leg wire-lead wire junctions. It will be appreciated that extensive experimentation and testing are required to find lead wire combinations which closely match the leg wire combinations over any range of temperatures. When lead wire combinations are found which closely match the leg wire combination over a range of temperatures approximately equal in extent to the range of temperatures to which the leg wire-lead wire junctions will be subjected, then it may be desirable to shift the range effective at the leg wire-lead wire junctions by adjustment as above in order to achieve the best match.

With the hot junction A subjected to temperatures in a range up to about 2700° C. which the thermocouple of this invention is intended to measure, the leg wire-lead wire junctions B and C are therefore spaced from the hot junction A and insulated so as to have a corresponding lower temperature within the range of 0 to about 200° C. In the Table II discussed below, the range of measurements given extends to 300° C. but a close match over a range of 200° C. is usually sufficient.

As used herein a suitable match between the leg and lead wires is one in which the variation in E.M.F. output of the legs per degree of temperature change does not differ more than about 10% from the variation in E.M.F. output of the lead wires resulting from the same change of temperature from a temperature at which the E.M.F. outputs are the same.

In Table II below the close match of lead and leg wires of the present invention are illustrated by comparing the potential difference or E.M.F. output of the leg wire couple with the potential difference of E.M.F. output of the lead wire couple.

TABLE II.—E.M.F. IN MILLIVOLTS

| Temperature °C. | Leg Wires 97% W—3% Re vs. 75% W—25% Re | Lead Wires 80% Ni—20% Cr vs. 98.8% Cu—0.8% Ni—0.4% Mn | Difference |
|---|---|---|---|
| 0 | 0 | 0 | 0 |
| 10 | 0.095 | 0.100 | 0.005 |
| 20 | 0.192 | 0.203 | 0.011 |
| 30 | 0.290 | 0.303 | 0.013 |
| 40 | 0.391 | 0.409 | 0.018 |
| 50 | 0.493 | 0.513 | 0.020 |
| 60 | 0.599 | 0.631 | 0.032 |
| 70 | 0.709 | 0.736 | 0.027 |
| 80 | 0.824 | 0.846 | 0.022 |
| 90 | 0.943 | 0.961 | 0.018 |
| 100 | 1.071 | 1.074 | 0.003 |
| 150 | 1.740 | 1.721 | −0.019 |
| 200 | 2.450 | 2.346 | −0.104 |
| 250 | 3.230 | 2.984 | −0.246 |
| 300 | 4.060 | 3.621 | −0.439 |

It will be appreciated that the above table is illustrative of a thermocouple of the present invention having leg and lead wires made of the preferred alloys and that certain variations in the percentages of ingredients of the alloys used may be made without departing from the spirit or scope of the invention as set forth in the following claims.

What is claimed is:

1. A thermocouple having a leg and lead wire combination comprising a first leg wire of 96-98% tungsten and 2-4% rhenium joined to a second leg wire of 74-80% tungsten and 20-26% rhenium, a lead wire connected to the first leg composed of 75-85% nickel, 15-25% chromium, 0-2% manganese and 0-0.15% carbon, and a lead wire connected to the second leg composed of 96-99% copper, 0.5-3% nickel and 0-1.5% manganese, said percentages of ingredients being by weight.

2. A thermocouple leg and lead wire combination as set forth in claim 1 in which the first leg wire is about 97% tungsten and about 3% rhenium.

3. A thermocouple leg and lead wire combination as set forth in claim 1 in which the second leg wire is about 75% tungsten and about 25% rhenium.

4. A thermocouple leg and lead wire combination as set forth in claim 1 in which the lead wire connected to the second leg is about 98.8% copper, about 0.8% nickel and about 0.4% manganese.

5. A thermocouple leg and lead wire combination as set forth in claim 1 in which the lead wire connected to the first leg is 77–82% nickel, 18–23% chromium, 0–2% manganese, and 0–0.15% carbon.

6. A thermocouple leg and lead wire combination as set forth in claim 1 in which the lead wire connected to the first leg is about 80% nickel and about 20% chromium.

References Cited by the Examiner
UNITED STATES PATENTS 2,337,000  12/1943  Ray _____ 136—227

WINSTON A. DOUGLAS, *Primary Examiner.*

A. B. CURTIS, *Assistant Examiner.*